US012768704B2

(12) United States Patent
Kim et al.

(10) Patent No.: US 12,768,704 B2
(45) Date of Patent: Oct. 20, 2026

(54) APPARATUS AND METHOD OF WEIGHT CALCULATION FOR VEHICLE

(71) Applicants: Hyundai Motor Company, Seoul (KR); Kia Corporation, Seoul (KR)

(72) Inventors: Jae Hun Kim, Hwaseong-si (KR); Tae Woong Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 349 days.

(21) Appl. No.: 18/437,446

(22) Filed: Feb. 9, 2024

(65) Prior Publication Data

US 2025/0137834 A1 May 1, 2025

(30) Foreign Application Priority Data

Oct. 30, 2023 (KR) ........................ 10-2023-0146378

(51) Int. Cl.
*G01G 19/08* (2006.01)

(52) U.S. Cl.
CPC .................................. *G01G 19/086* (2013.01)

(58) Field of Classification Search
None
See application file for complete search history.

(56) References Cited

U.S. PATENT DOCUMENTS

2019/0039595 A1 * 2/2019 Hawley ............... B60L 15/2018

* cited by examiner

*Primary Examiner* — Walter L Lindsay, Jr.
*Assistant Examiner* — Geoffrey T Evans
(74) *Attorney, Agent, or Firm* — Slater Matsil, LLP

(57) ABSTRACT

An embodiment apparatus for calculating a weight of a vehicle includes a sensor configured to sense a 3-axis acceleration value of each wheel of the vehicle, a receiver configured to receive sensing data of the sensor, a storage configured to store vehicle data of the vehicle, and a weight calculator configured to calculate a loaded weight of the vehicle using the 3-axis acceleration value and the vehicle data.

20 Claims, 7 Drawing Sheets

APPARATUS AND METHOD OF WEIGHT CALCULATION FOR VEHICLE

CROSS-REFERENCE TO RELATED APPLICATIONS

This application claims the benefit of Korean Patent Application No. 10-2023-0146378, filed on Oct. 30, 2023, which application is hereby incorporated herein by reference in its entirety.

TECHNICAL FIELD

The present disclosure relates to an apparatus and a method of weight calculation for a vehicle.

BACKGROUND

Recently, with the expansion of autonomous traveling and shared services, safety and reliability of vehicles has been further emphasized, and accordingly, demand for a technique for monitoring a status of a vehicle in real time has increased. In particular, information about a weight of a vehicle may be an important variable in advanced control techniques of the vehicle.

As for general techniques for calculating changes in a weight of a vehicle, changes in weight may be predicted by installing additional direct sensors (a weight/height sensor) or calculating a load through a mathematically modeled vehicle model based on physical arithmetic. The former may have the disadvantage of increased calculation errors and increased material costs due to deterioration of chassis parts, and the latter may have the limitation of large calculation errors.

SUMMARY

An embodiment of the present disclosure provides an apparatus and a method which may easily and accurately calculate a weight of a moving vehicle using basic vehicle data and a sensing value.

An embodiment of the present disclosure provides an apparatus and a method which may simply calculate a weight of a moving vehicle without any separately installed components to measure a weight of the vehicle.

According to an embodiment of the present disclosure, an apparatus for calculating a weight of a vehicle includes a sensing portion configured to sense a 3-axis acceleration value of each wheel of the vehicle, a receiving portion configured to receive sensing data of the sensing portion, a storage portion configured to store vehicle data, and a weight calculation portion configured to calculate a loaded weight of the vehicle using the 3-axis acceleration value and vehicle data transmitted to the receiving portion.

The loaded weight calculated by the weight calculation portion may be stored in the storage portion.

The weight calculation portion may calculate the loaded weight repeatedly in a determined period and may store the weight in the storage portion.

The sensing portion may include an acceleration sensor provided on a wheel bearing installed on each wheel of the vehicle.

The sensing portion may be installed on a component moving with each wheel of the vehicle.

The storage portion may store at least a camber-stroke relationship between wheels of the vehicle, a spring rate of a suspension, and a lever ratio according to a position in which the suspension is connected to a lower arm as basic information of the vehicle.

The weight calculation portion may include a camber value calculation portion configured to calculate a camber value of each wheel based on a 3-axis acceleration value of each wheel sensed by the sensing portion, a deflection calculation portion configured to calculate height deflection (the amount of change in suspension length) according to a camber value based on a camber-stroke relationship between wheels stored in the storage portion, and a wheel weight calculation portion configured to calculate a loaded weight applied to each wheel using the height deflection and characteristics of the suspension.

The weight calculation portion may calculate a total loaded weight of the vehicle by summing the entirety of loaded weights applied to each wheel calculated by the wheel weight calculation portion.

The wheel weight calculation portion may calculate a loaded weight applied to each wheel by multiplying the height deflection by a spring rate of the suspension and the lever ratio.

According to an embodiment of the present disclosure, a method of calculating a weight of a vehicle includes a sensing operation of sensing a 3-axis acceleration value of each wheel of the vehicle, a receiving operation of receiving information sensed in the sensing operation, a weight calculating operation of calculating a loaded weight of the vehicle using the 3-axis acceleration value received by the receiving operation, and a storing operation of storing calculated loaded weight information.

The method may be repeated with a determined period.

The weight calculating operation may calculate a loaded weight of a vehicle using a camber-stroke relationship between wheels of the vehicle, a spring rate of the suspension, and a lever ratio according to a position in which a suspension is connected to a lower arm.

The weight calculating operation may include a camber value calculating operation of calculating a camber value of each wheel based on a 3-axis acceleration value of each wheel sensed in the sensing operation, a deflection calculating operation of calculating a height deflection (the amount of change in suspension length) according to the camber value based on a camber-stroke relationship between wheels, and a wheel weight calculating operation configured to calculate a loaded weight applied to each wheel using the height deflection and characteristics of the suspension.

The weight calculating operation may include calculating a total loaded weight of the vehicle by summing the entirety of weights applied to each wheel calculated by the wheel weight calculating operation.

The wheel weight calculating operation may include calculating a loaded weight applied to each wheel by multiplying the height deflection by a spring rate of the suspension and the lever ratio.

According to an embodiment of the present disclosure, a method of calculating a weight of a vehicle may be stored in a computer-readable storage medium as a program executed on a computer.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Figure 1:
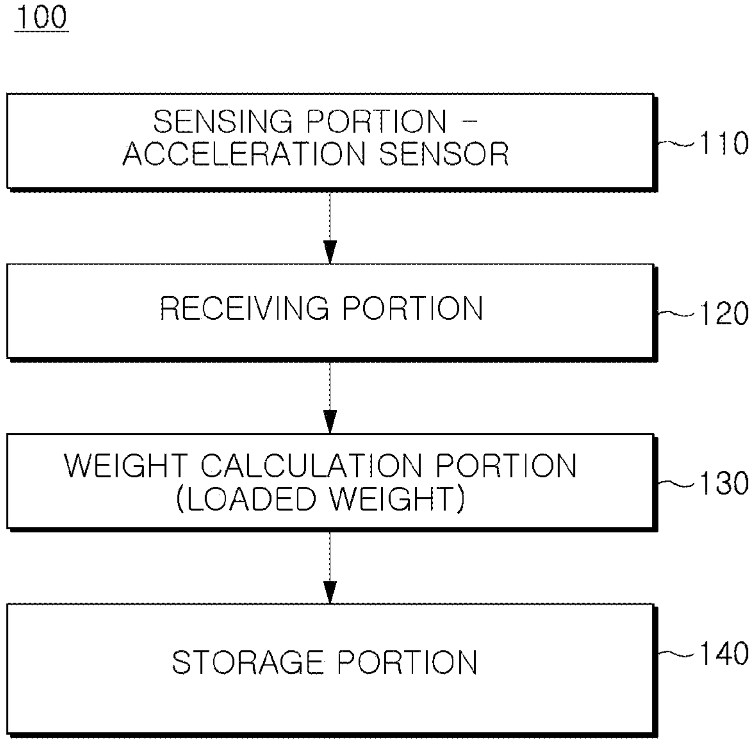
FIG. 1 is a diagram illustrating an apparatus for calculating a weight of a vehicle according to an embodiment of the present disclosure.

Hereinafter, embodiments of the present disclosure will be described with reference to the attached drawings.

Various embodiments will be described with reference to the accompanying drawings. However, this may not necessarily limit the scope in the embodiments to a specific embodiment form. Instead, modifications, equivalents, and replacements included in the disclosed concept and technical scope of this description may be employed. Throughout the specification, similar reference numerals are used for similar elements.

In the embodiments, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right in the embodiments.

The embodiments may be implemented in various manners, and they are not limited to the embodiments described herein. An expression used in the singular encompasses the expression of the plural, unless it has a clearly different meaning in the context. The terms "include," "comprise," "is configured to," or the like of the description are used to indicate the presence of features, numbers, steps, operations, elements, parts, or combination thereof, and do not exclude the possibilities of combination or addition of one or more features, numbers, steps, operations, elements, parts, or combination thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and they are not to be interpreted as having ideal or excessively formal meanings unless clearly defined as having such in the present application.

In embodiments, a vehicle may refer to various vehicles moving transported objects, such as people, animals, or goods, from an origin to a destination. The vehicle is not limited to vehicles travelling on roads or tracks.

Figure 6:
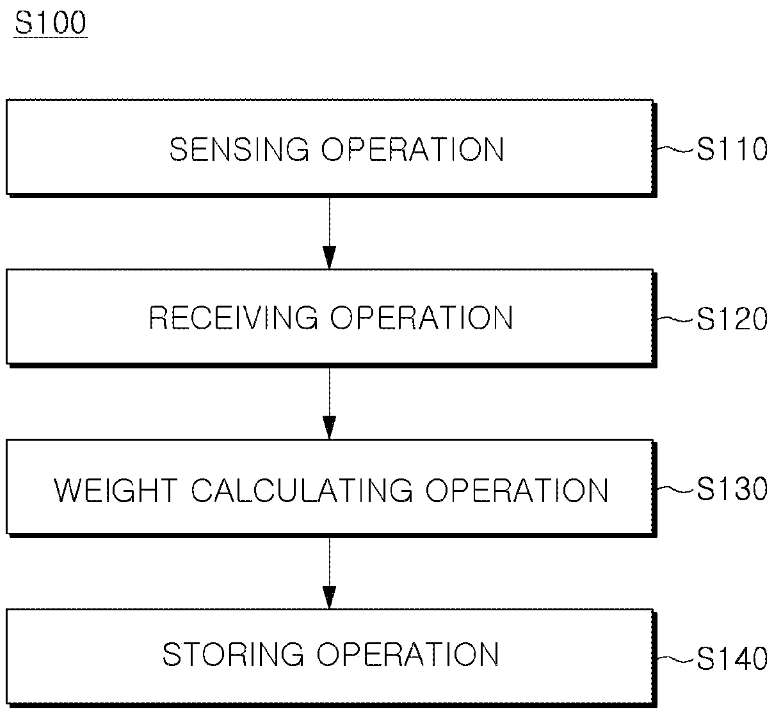
FIG. 6 is a diagram illustrating a method of calculating a weight of a vehicle according to an embodiment of the present disclosure.

Referring to FIGS. 1 and 6, an apparatus 100 for calculating a weight of a vehicle or a method of calculating a weight (S100) in an embodiment may be configured as a logic (an apparatus or a method) of repeatedly calculating a weight (loaded weight) of a moving vehicle in real time. Basically, in the embodiment, the loaded weight of a vehicle may be calculated on the basis of the amount of deflection (change in length of suspension), and the total weight of the vehicle may be calculated on the basis of vehicle body information of the vehicle stored in the storage portion. In the description below, calculating a loaded weight of a vehicle according to embodiments will be described.

According to an embodiment, a loaded weight of a vehicle may be calculated simply and relatively accurately by using a signal of a 3-axis acceleration sensor provided on each wheel of the vehicle.

Hereinafter, the apparatus 100 for calculating a weight of a vehicle will be described with reference to FIG. 1, and the calculating method (S100) will be described later.

FIG. 1 is a diagram illustrating an apparatus for calculating a weight of a vehicle according to an embodiment.

The apparatus 100 for calculating a weight of a vehicle according to the embodiment may monitor a weight loaded on the vehicle in real time, and it may use various control devices of the vehicle more efficiently on the basis of the calculated loaded weight of the vehicle.

The apparatus 100 for calculating a weight of a vehicle in an embodiment may include a sensing portion 110, a receiving portion 120, a weight calculation portion 130, and a storage portion 140.

Although the controller is not illustrated in the attached drawings, in the embodiment, a controller configured to control the apparatus 100 for calculating a weight of a vehicle and method of calculating a weight of a vehicle (S100) may be provided, and overall control may be performed by the controller. For example, the controller may be linked to the apparatus 100 for calculating a weight of a vehicle, and it may be linked to the sensing portion 110, the receiving portion 120, the weight calculation portion 130, and the storage portion 140 and may relate to control of the components.

The apparatus 100 in the embodiment may calculate a weight loaded on the vehicle, that is, a weight loaded in addition to a vehicle body weight, and may ultimately calculate the total weight (vehicle body+loaded weight) if desired.

In the embodiment, the loaded weight of a vehicle may be calculated using basic information about the vehicle, such as a camber-stroke relationship between wheels of the vehicle, a spring rate of the suspension, and a lever ratio according to a position in which the suspension is connected to a lower arm, and a value sensed by a 3-axis acceleration sensor provided on each wheel in real time.

The sensing portion 110 may sense a 3-axis acceleration value of each wheel of the vehicle. The sensing portion 110 may include an acceleration sensor provided on a wheel bearing installed on each wheel of the vehicle. The wheel bearing may be configured as an intelligent wheel bearing integrating a wheel speed sensor and an acceleration sensor, and the intelligent wheel bearing may connect the wheel speed sensor to the acceleration sensor by simply one connector. However, an embodiment thereof is not limited thereto, and the acceleration sensor may be installed on a component moving with each wheel of the vehicle, such as wheels, knuckles, disks, or the like.

The receiving portion 120 may receive information sensed by the acceleration sensor of the sensing portion 110. The receiving portion 120 may receive the 3-axis acceleration value from the sensing portion 110.

The storage portion 140 may store basic information of the vehicle, such as a camber-stroke relationship between wheels of the vehicle, a spring rate of the suspension, and a lever ratio according to a position in which the suspension is connected to the lower arm, and the loaded weight information of each wheel of the vehicle calculated by the weight calculation portion 130 may be stored. In the weight calculation portion 130, the loaded weight of a vehicle may be calculated by periodically repeating in a determined period (e.g., 1 to 10 seconds), and accordingly, the calculated weight may be repeatedly stored in the storage portion 140.

Figure 2:
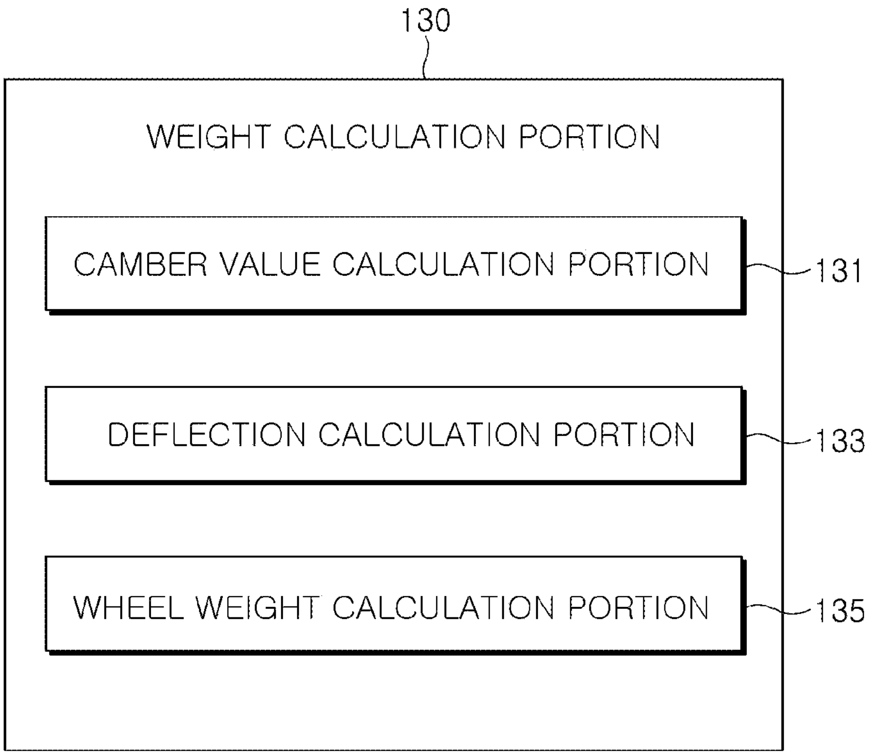
FIG. 2 is a diagram illustrating an example of a weight calculation portion in an apparatus for calculating a weight of a vehicle according to an embodiment of the present disclosure.

Referring to FIG. 2, the weight calculation portion 130 may include a camber value calculation portion 131, a deflection calculation portion 133, and a wheel weight calculation portion (loaded weight) 125.

The camber value calculation portion 131 may calculate a camber value of each wheel on the basis of a 3-axis acceleration value of each wheel sensed by the sensing portion 110.

Figure 3:
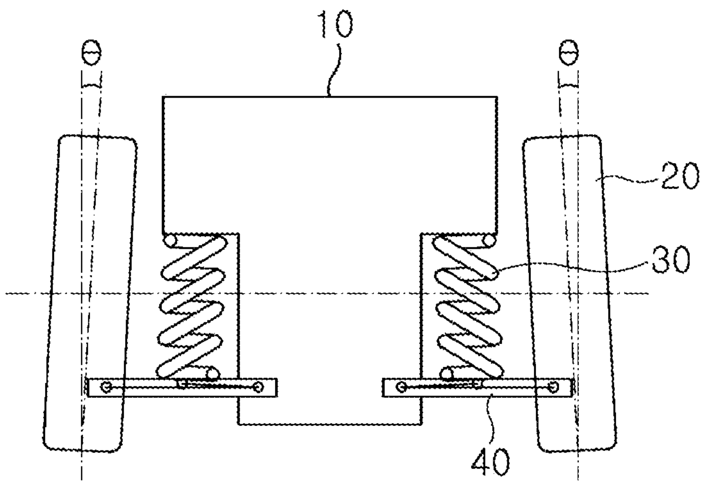
FIG. 3 is a reference diagram illustrating a principle by which a loaded weight of a vehicle is calculated by an apparatus for calculating a weight of a vehicle according to an embodiment of the present disclosure.
Figure 4:
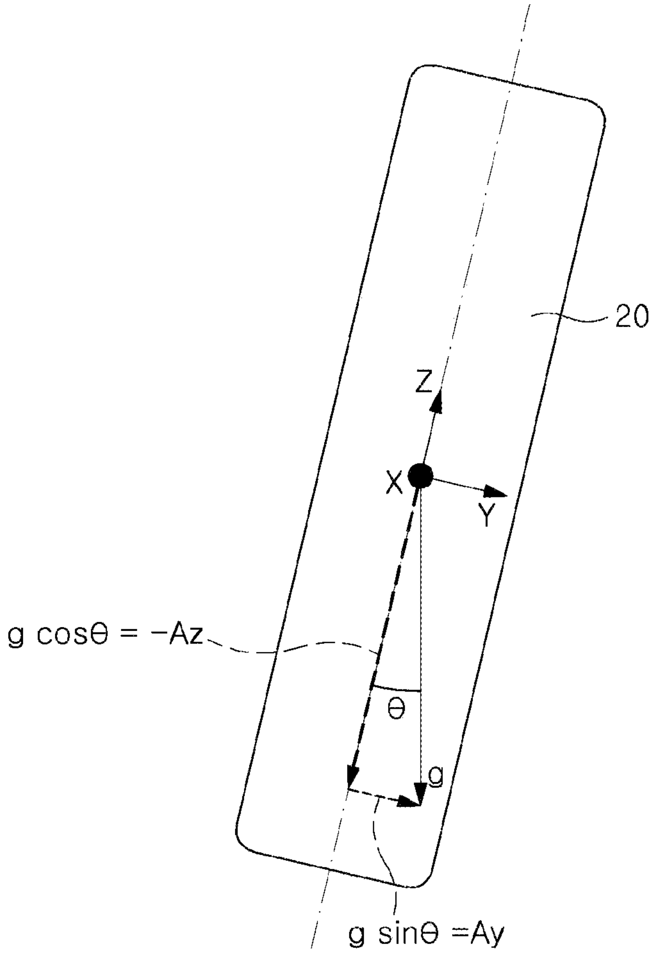
FIG. 4 is a reference diagram illustrating a method of calculating a camber value in an apparatus for calculating a weight of a vehicle according to an embodiment of the present disclosure.

Referring to FIGS. 3 and 4, the vehicle may include a vehicle body 10, a wheel 20 enabling traveling of the vehicle body 10, a suspension 30 dampening impacts applied to the vehicle body 10, and a lower arm 40 connecting the suspension to the wheel 20.

When acceleration is applied to the vehicle or a weight is added, the wheel 20 of the vehicle may be tilted with respect to a ground plane, which may indicate that a radial direction (Z-direction) of the vehicle may be tilted with respect to a gravity direction g. Accordingly, an angle (θ) at which the vehicle's wheel 20 is inclined with respect to the gravity direction g may be formed, and the angle may correspond to a camber value (θ).

Each wheel of the vehicle may include a 3-axis acceleration sensor, and accordingly, the 3-axis acceleration of each wheel may be sensed by the acceleration sensor while the vehicle is traveling. In principle, a resultant force of 3-axis acceleration sensed by the 3-axis acceleration sensor may be equal to gravity as in Equation 1 below.

$$\sqrt{(Ax^2 + Ay^2 + Az^2)} = 1 \times g \quad \text{Equation 1}$$

Here, referring to FIG. 4, Ax is acceleration in the X-direction, Ay is acceleration in the Y-direction, Az is acceleration in the Z-direction, and g is gravity acceleration.

From this equation, the camber value, which is the angle (θ) between the Z-X plane and ground, may be calculated by Equation 2 below.

$$Az = -g \times \cos\theta \quad \text{Equation 2}$$

$$Au = g \times \sin\theta$$

$$\tan\theta = Au/Az$$

$$\theta = \tan^{-1}(Ay/Az)$$

The deflection calculation portion 133 may calculate a height deflection (wheel stroke, the amount of change in suspension length) (Δh) according to the camber value (θ) on the basis of the camber-stroke relationship between wheels stored in the storage portion.

Figure 5:
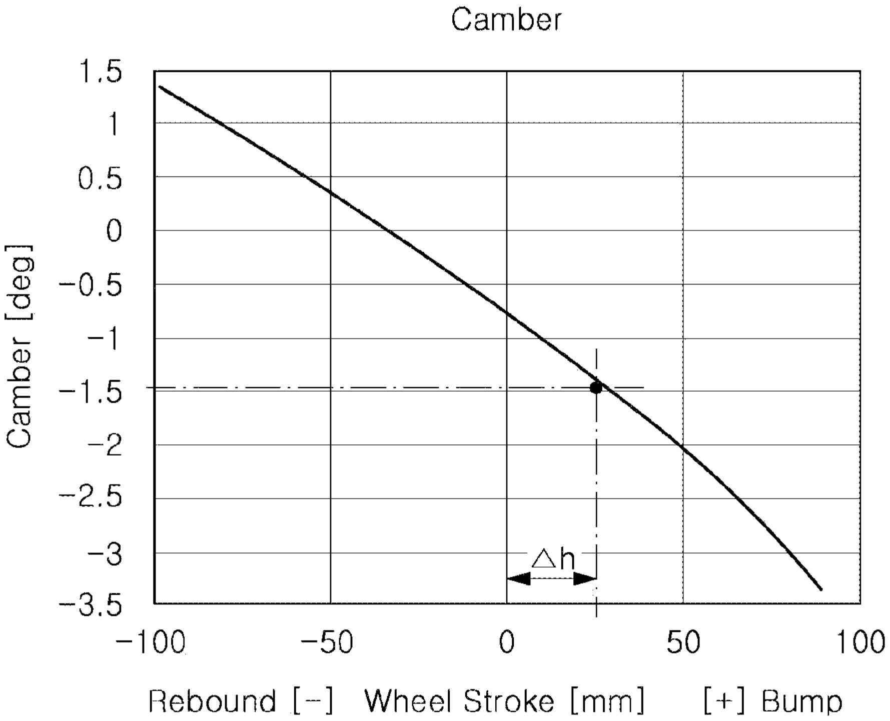
FIG. 5 is a reference diagram illustrating a graph for calculating the amount of deflection (the amount of change in length of suspension) in an apparatus for calculating a weight of a vehicle according to an embodiment of the present disclosure.

Referring to FIG. 5, an example of a graph illustrating the camber-stroke relationship between wheels stored in the storage portion may be disclosed. The camber-stroke relationship of the wheel may be obtained from kinematics & compliance (K&C) characteristic data of the suspension already obtained from the vehicle design operation, and it may be a data value collected using a suspension parameter measurement device (SPMD) data or through sensor calibration. This may be data corresponding to basic vehicle data, and data stored in the storage portion 140 may be used.

As illustrated in FIG. 5, when the camber value (θ) of each wheel is obtained, height deflection (wheel stroke, the amount of change in suspension length) (Δh) may be calculated through the graph of the camber-stroke relationship between wheels. For example, in FIG. 5, it may be indicated that the wheel stroke (Δh) value for a camber value of −1.5 may be approximately 25 mm.

As the front and rear wheels usually exhibit different trends, the wheel camber-stroke relationship graph may be separately provided and stored in the storage portion 140.

The wheel weight calculation portion 135 may calculate the loaded weight applied to each wheel using the height deflection (Δh) and the suspension characteristics using Equation 3 below.

$$\Delta weight = \Delta h \times k \times r \quad \text{Equation 3}$$

Here, Δweight is a loaded weight, Δh is a height deflection, k is a spring rate of the suspension, and r is a lever ratio according to a position in which the suspension is connected to the lower arm, which is determined at the time of vehicle design.

Using Equation 3 and assuming that Δh is 25 mm, k is 5 kgf/mm, and r is 0.6, the loaded weight (Δweight) according to the embodiment may be calculated as, for example, 25 mm*5 kgf/mm*0.6=75 kg.

Also, the weight calculation portion 130 may calculate the total loaded weight of the vehicle by summing the entirety of loaded weights applied to each wheel calculated by the wheel weight calculation portion 135.

In the description below, the method of calculating a weight of a vehicle (S100) which may be implemented using at least a portion of the apparatus 100 for calculating a weight of a vehicle described above will be described.

Figure 7:
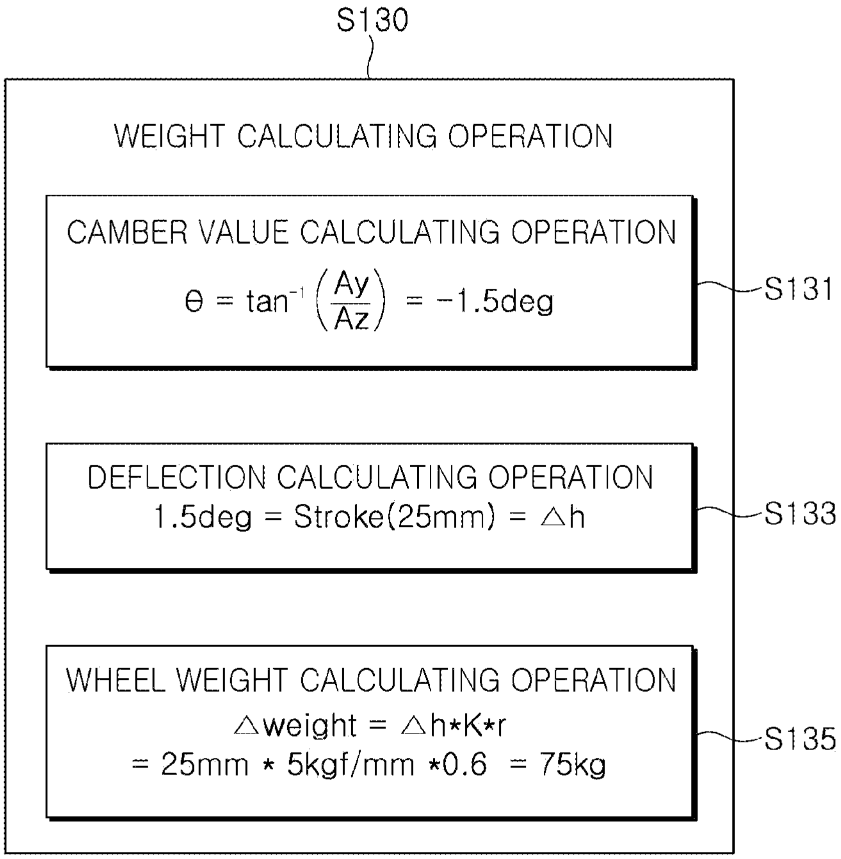
FIG. 7 is a diagram illustrating an operation of calculating a weight of a method of calculating a weight of a vehicle according to an embodiment of the present disclosure.

FIG. 6 is a diagram illustrating a method of calculating a weight of a vehicle according to an embodiment. FIG. 7 is a diagram illustrating an operation of calculating a weight of a method of calculating a weight of a vehicle according to an embodiment.

The method of calculating a weight of a vehicle (S100) according to the embodiment may monitor a weight loaded on a vehicle in real time, and various control devices of the vehicle may be utilized efficiently on the basis of the calculated loaded weight of a vehicle.

The method of calculating a weight of a vehicle (S100) in an embodiment may include a sensing operation (S110), a receiving operation (S120), a weight calculating operation (S130), and a storing operation (S140).

Although the controller is not illustrated in the attached drawings, in the embodiment, a controller configured to control the apparatus 100 for calculating a weight of a vehicle and the method of calculating a weight of a vehicle (S100) may be provided, and overall control may be performed by the controller. For example, the controller may be related to controlling the method of calculating a weight of a vehicle (S100), specifically, the controller may be related to control over the sensing operation (S110), the receiving operation (S120), the weight calculating operation (S130), and the storing operation (S140), and it may be related to control over the components by interlocking with the sensing portion 110, the receiving portion 120, the weight calculation portion 130, and the storage portion 140.

The weight calculating method (S100) in the embodiment may include calculating a weight loaded on the vehicle, that is, a weight loaded in addition to a vehicle body weight, and ultimately calculating a total weight (vehicle body+loaded weight) if desired.

In the embodiment, a loaded weight of a vehicle may be calculated using basic information of the vehicle stored in the storage portion 140, such as a camber-stroke relationship between wheels of the vehicle, a spring rate of the suspension, and a lever ratio according to a position in which the suspension is connected to the lower arm, and a value sensed by a 3-axis acceleration sensor provided on each wheel in real time.

The method of calculating a weight of a vehicle (S100) may be performed by the apparatus 100 for calculating a weight of a vehicle described above, and each individual operation may be performed by the sensing portion 110, the receiving portion 120, the weight calculation portion 130, and the storage portion 140.

The sensing operation (S110) may include sensing a 3-axis acceleration value of each wheel of the vehicle. The sensing operation (S110) may include sensing three-axis acceleration values using the sensing portion 110, that is, an acceleration sensor, provided on the wheel bearing installed on each wheel of the vehicle. The sensing operation (S110) may be performed by a maximum sensing portion 110.

The wheel bearing may be configured as an intelligent wheel bearing integrating a wheel speed sensor and an acceleration sensor, and the intelligent wheel bearing may connect the wheel speed sensor to the acceleration sensor with only one connector. However, an embodiment thereof is not limited thereto, and the acceleration sensor may be installed on a component moving together with each wheel of the vehicle, such as wheels, knuckles, disks, or the like.

The receiving operation (S120) may be an operation of receiving the information sensed in the sensing operation by the receiving portion 120 (S110). In the receiving operation (S120), the receiving portion 120 may receive a 3-axis acceleration value from the sensing portion 110. The receiving operation (S120) may be performed by the receiving portion 120. The storing operation (S140) may store the loaded weight information of each wheel of the vehicle calculated by the weight calculating operation (S130).

The loaded weight information calculated by the weight calculating operation (S130) may be stored in the storage portion 140 in the storing operation (S140). The storage portion 140 may store basic information about the vehicle, such as a camber-stroke relationship between wheels of the vehicle, a spring rate of the suspension, a lever ratio according to a position in which the suspension is connected to a lower arm, and a vehicle body weight, and the weight calculating operation (S130) may use information stored in the storage portion 140 or may store the calculated weight in the storage portion 140.

The weight calculating operation (S130) may include calculating a loaded weight of a vehicle by periodically repeating in a determined period (e.g., 1 to 10 seconds) using the weight calculation portion 130, and accordingly, the calculated weight may be repeatedly stored in the storage portion 140. The weight calculating operation (S130) may be performed by the weight calculation portion 130.

Referring to FIG. 7, the weight calculating operation (S130) may include a camber value calculating operation (S131), a deflection calculating operation (S133), and a wheel weight calculating operation (loaded weight) (S135).

The camber value calculating operation (S131) may include calculating a camber value of each wheel on the basis of a 3-axis acceleration value of each wheel sensed by the sensing portion 110 in the sensing operation (S110).

Referring to FIGS. 3 and 4, the vehicle may include the vehicle body 10, the wheel 20 enabling traveling of the vehicle body 10, the suspension 30 for dampening impacts applied to the vehicle body 10, and the lower arm 40 connecting the suspension and the wheel 20.

When acceleration is applied to a vehicle or a weight is added, the wheel 20 of the vehicle may be tilted with respect to a ground plane, which may indicate that a radial direction (Z-direction) of the vehicle may be inclined with respect to a gravity direction g. Accordingly, an angle ($\theta$) at which the vehicle's wheel 20 is inclined with respect to the gravity direction g may be formed, and this angle may correspond to the camber value ($\theta$).

Each wheel of the vehicle may include a 3-axis acceleration sensor, and accordingly, a 3-axis acceleration of each wheel may be sensed by the acceleration sensor while the vehicle is traveling. In principle, a resultant force of 3-axis acceleration sensed by the 3-axis acceleration sensor may be equal to gravity in Equation 1 as described above.

From this equation, the camber value, which is the angle ($\theta$) between the Z-X plane and ground, may be calculated by Equation 2 mentioned above.

The deflection calculating operation (S133) may include calculating a height deflection (a wheel stroke, the amount of change in suspension length) ($\Delta h$) according to the camber value ($\theta$) on the basis of a camber-stroke relationship between wheels stored in the storage portion in the deflection calculation portion 133.

As illustrated in FIG. 5, when the camber value ($\theta$) of each wheel is obtained, a height deflection (a wheel stroke, the amount of change in suspension length) ($\Delta h$) may be calculated through the graph of camber-stroke relationship between wheels. For example, in FIG. 5, it may be indicated that the wheel stroke ($\Delta h$) value for a camber value of −1.5 may be approximately 25 mm.

As the front and rear wheels usually exhibit different trends, the graph of camber-stroke relationship between wheels may be prepared separately and stored in the storage portion 140.

The wheel weight calculating operation (S135) may include calculating a loaded weight applied to each wheel using the height deflection ($\Delta h$) and characteristics of the suspension in the wheel weight calculation portion 135 by Equation 3 described above.

In the end, using Equation 3 and assuming that $\Delta h$ is 25 mm, k is 5 kgf/mm, and r is 0.6, the loaded weight ($\Delta$weight) according to the embodiment may be calculated as, for example, 25 mm*5 kgf/mm*0.6=75 kg.

Also, the weight calculating operation (S130) may include calculating a total loaded weight of the vehicle by summing the entirety of loaded weights applied to each wheel calculated by the wheel weight calculating operation (S135).

The storing operation (S140) may include storing the calculated loaded weight information in the storage portion 140. The storing operation (S140) may be performed by the storage portion 140.

The method of calculating a weight of a vehicle may be repeated in a determined period, and the repeatedly calculated loaded weight information of the vehicle may be stored in the storage portion 140 in the storing operation (S140).

The methods according to embodiments may be implemented in the form of program instructions which may be executed through various computer means and written on a computer-readable medium. A computer-readable medium may include program instructions, data files, data structures, and the like alone or in combination. Program instructions written on a computer-readable medium may be specially designed and configured for the embodiments or may be known and usable by those skilled in the art of computer software.

Examples of a computer-readable medium may include hardware devices specially configured to store and execute program instructions, such as ROM, RAM, flash memory, or the like. Examples of program instructions may include machine language code created by a compiler, as well as high-level language code which may be executed by a computer using an interpreter, or the like. The above-described hardware device may be configured to operate with at least one software module to perform operations described in the embodiments, and vice versa.

The apparatus 100 for calculating a weight of a vehicle in the embodiment may include a storage portion 140. The storage portion 140 may be a recording medium suitable for the storing apparatus 100 for calculating a weight of a vehicle, for example, magnetic media such as a hard disk, a floppy disk, and a magnetic tape, optical media such as a compact disk read only memory (CD-ROM) and a digital video disk (DVD), magneto-optical media, such as a floptical disk, or a semiconductor memory such as a flash memory, an erasable programmable ROM (EPROM), or an SSD manufactured based on the memories.

The embodiments may be implemented by a non-volatile memory (not shown) configured to store data relating to algorithms configured to control operations of various components of the vehicle or software instructions reproducing the algorithms, and a processor (not illustrated) configured to perform operations described above or below using data stored in the corresponding memory. Here, a memory and a processor may be implemented as individual chips. Alternatively, a memory and a processor may be implemented as a single chip integrated with each other. A processor may have the form of one or more processors.

The components of apparatus 100 for calculating a weight of a vehicle may be connected in a wired manner or wirelessly and may exchange information using a network provided in the vehicle. The method of calculating a weight of a vehicle (S100) may also exchange information in a wired manner or wirelessly using a network provided in the vehicle. For example, data may be exchanged using network communication means provided in a vehicle, such as Ethernet, media oriented systems transport (MOST), Flexray, controller area network (CAN), local interconnect network (LIN), Internet, LTE, 5G, Wi-Fi, Bluetooth, near field communication (NFC), Zigbee, radio frequency (RF), and the like.

According to the aforementioned embodiments, the apparatus and the method may easily and accurately calculate a weight of a moving vehicle using basic vehicle data and a sensing value.

Also, the weight of a moving vehicle may be simply and relatively accurately calculated without a separately mounted component to measure a weight of the vehicle.

While the embodiments have been illustrated and described above, it will be apparent to those skilled in the art that modifications and variations could be manufactured without departing from the scope of the embodiments of the present disclosure as defined by the appended claims.

What is claimed is:

1. An apparatus for determining a loaded weight of a vehicle, the apparatus comprising:
- a sensor configured to sense a 3-axis acceleration value of each wheel of the vehicle;
- a receiver configured to receive sensing data of the sensor;
- a first storage device configured to store vehicle data of the vehicle; and
- a weight calculator comprising:
  - a processor; and
  - a second storage device storing instructions that, when executed by the one or more processors, cause the one or more processors to:
    - determine the loaded weight of the vehicle using the 3-axis acceleration value and the vehicle data, wherein the instructions that, when executed by the one or more processors, cause the one or more processors to determine the loaded weight further comprise instructions that, when executed by the one or more processors, cause the one or more processors to determine a camber value of each wheel based on the 3-axis acceleration value of each wheel sensed by the sensor.

2. The apparatus of claim 1, wherein the first storage device is configured to store the loaded weight determined by the weight calculator.

3. The apparatus of claim 1, wherein the instructions further comprise instructions that, when executed by the one or more processors, cause the one or more processors to:
- determine the loaded weight repeatedly in a determined period and provide each of the repeatedly determined loaded weights for storage in the first storage device.

4. The apparatus of claim 1, wherein the sensor comprises an acceleration sensor disposed on a wheel bearing disposed on each wheel of the vehicle.

5. The apparatus of claim 1, wherein the sensor is disposed on a component configured to move with each wheel of the vehicle.

6. The apparatus of claim 1, wherein the vehicle data comprises a camber-stroke relationship between the wheels of the vehicle, a spring rate of a suspension of the vehicle, and a lever ratio according to a position in which the suspension is connected to a lower arm of the vehicle.

7. The apparatus of claim 6, wherein
- the instructions further comprise instructions that, when executed by the one or more processors, cause the one or more processors to:
  - determine a height deflection according to the camber value based on the camber-stroke relationship between the wheels of the vehicle, wherein the height deflection comprises an amount of change in a length of the suspension; and determine the loaded weight applied to each wheel using the height deflection and characteristics of the suspension.

8. The apparatus of claim 7, wherein the instructions further comprise instructions that, when executed by the one or more processors, cause the one or more processors to:

determine a total loaded weight of the vehicle by summing an entirety of the determined loaded weights applied to each wheel.

9. The apparatus of claim 7, wherein the instructions further comprise instructions that, when executed by the one or more processors, cause the one or more processors to:

determine the loaded weight applied to each wheel by multiplying the height deflection by the spring rate of the suspension and the lever ratio.

10. A method of determining a loaded weight of a vehicle, the method comprising:

sensing a 3-axis acceleration value of each wheel of the vehicle;

receiving the 3-axis acceleration value of each wheel of the vehicle;

determining the loaded weight of the vehicle using the 3-axis acceleration value, wherein determining the loaded weight of the vehicle comprises determining the loaded weight of the vehicle using a camber-stroke relationship between the wheels of the vehicle; and storing the loaded weight information.

11. The method of claim 10, further comprising:

repeating the method of determining the loaded weight of the vehicle according to a determined period.

12. The method of claim 10, wherein determining the loaded weight of the vehicle comprises determining the loaded weight of the vehicle using a spring rate of a suspension of the vehicle and a lever ratio according to a position in which the suspension is connected to a lower arm.

13. The method of claim 10, wherein determining the loaded weight of the vehicle comprises:

determining a camber value of each wheel based on the 3-axis acceleration value of each wheel;

determining a height deflection according to the camber value based on the camber-stroke relationship between the wheels, wherein the height deflection is an amount of change in a length of a suspension of the vehicle; and determining the loaded weight applied to each wheel using the height deflection and characteristics of the suspension.

14. The method of claim 13, wherein determining the loaded weight of the vehicle comprises determining a total loaded weight of the vehicle by summing an entirety of the loaded weights applied to each wheel.

15. The method of claim 13, wherein determining the loaded weight of the vehicle comprises determining the loaded weight applied to each wheel by multiplying the height deflection by a spring rate of the suspension and a lever ratio.

16. A non-transitory computer-readable storage medium storing a program including instructions that, when executed by one or more processors, cause a controller to execute a method of determining a loaded weight of a vehicle, wherein the instructions include instructions for:

sensing a 3-axis acceleration value of each wheel of the vehicle;

receiving the 3-axis acceleration value of each wheel of the vehicle;

determining the loaded weight of the vehicle using the 3-axis acceleration value, wherein determining the loaded weight of the vehicle comprises determining the loaded weight of the vehicle using a camber-stroke relationship between the wheels of the vehicle; and storing the loaded weight information.

17. The non-transitory computer-readable storage medium of claim 16, wherein the instructions further include instructions for repeating the method of determining the loaded weight of the vehicle according to a determined period.

18. The non-transitory computer-readable storage medium of claim 16, wherein the instructions for determining the loaded weight of the vehicle further comprise instructions for determining the loaded weight of the vehicle using a spring rate of a suspension of the vehicle, and a lever ratio according to a position in which the suspension is connected to a lower arm.

19. The non-transitory computer-readable storage medium of claim 16, wherein the instructions for determining the loaded weight of the vehicle further comprise instructions for:

determining a camber value of each wheel based on the 3-axis acceleration value of each wheel;

determining a height deflection according to the camber value based on the camber-stroke relationship between the wheels, wherein the height deflection is an amount of change in a length of a suspension of the vehicle; and determining the loaded weight applied to each wheel using the height deflection and characteristics of the suspension.

20. The non-transitory computer-readable storage medium of claim 19, wherein the instructions for determining the loaded weight of the vehicle further comprise instructions for determining a total loaded weight of the vehicle by summing an entirety of the loaded weights applied to each wheel.

* * * * *